United States Patent [19]
Von Linsowe

[11] 3,729,016
[45] Apr. 24, 1973

[54] APPARATUS FOR PRODUCING A FLUID-FLOW CONNECTION BETWEEN RELATIVELY MOVABLE STATIONARY AND MOBILE CONDUIT SYSTEMS

[75] Inventor: Carl V. Von Linsowe, San Jose, Calif.

[73] Assignee: John T. Page, Portland, Oreg. ; a part interest

[22] Filed: June 1, 1971

[21] Appl. No.: 149,032

Related U.S. Application Data

[63] Continuation of Ser. No. 14,455, Feb. 26, 1970, abandoned.

[52] U.S. Cl. ................................137/344, 239/212
[51] Int. Cl. ..........................B05b 9/02, E01h 3/02
[58] Field of Search ................137/344; 239/212, 239/213, 181, 183

[56] References Cited

UNITED STATES PATENTS

| | | | |
|---|---|---|---|
| 3,463,175 | 8/1969 | Rogers | 137/344 X |
| 1,373,660 | 4/1921 | Iverson | 239/212 |
| 2,750,228 | 6/1956 | Engel | 239/212 X |
| 3,349,794 | 10/1967 | Behlen | 239/183 X |
| 3,444,941 | 5/1969 | Purtell | 137/344 X |
| 3,538,941 | 11/1970 | Bates | 239/212 X |
| 3,575,200 | 4/1971 | Imeson | 137/344 |
| 3,613,703 | 10/1971 | Stout | 239/212 X |

*Primary Examiner*—Samuel Scott
*Attorney*—Kolisch, Hartwell & Dickinson

[57] ABSTRACT

An irrigation system including a stationary water supply having plural spaced-apart outlet couplings, and a mobile irrigator adapted to travel adjacent and relative to the supply and to receive water therefrom, having a pair of movable inlet couplings. Apparatus is provided on the irrigator for adjusting automatically the positions of the inlet couplings with travel of the irrigator, whereby with one inlet coupling connected to an outlet coupling, the other inlet coupling advances toward a ready-to-connect position relative to the next adjacent outlet coupling in the direction of irrigator travel. Such apparatus promotes successive fluid-flow connections between the supply and irrigator with the latter traveling relative to the former, and with the outlet couplings in the stationary supply spaced close enough, promotes a continuous fluid-flow connection between the supply and irrigator.

32 Claims, 17 Drawing Figures

Patented April 24, 1973

Carl V. von Linsowe
INVENTOR
BY Kalisch & Hartwell.
Attys

Carl V. von Linsowe
INVENTOR
BY Kolisch & Hartwell
Attys

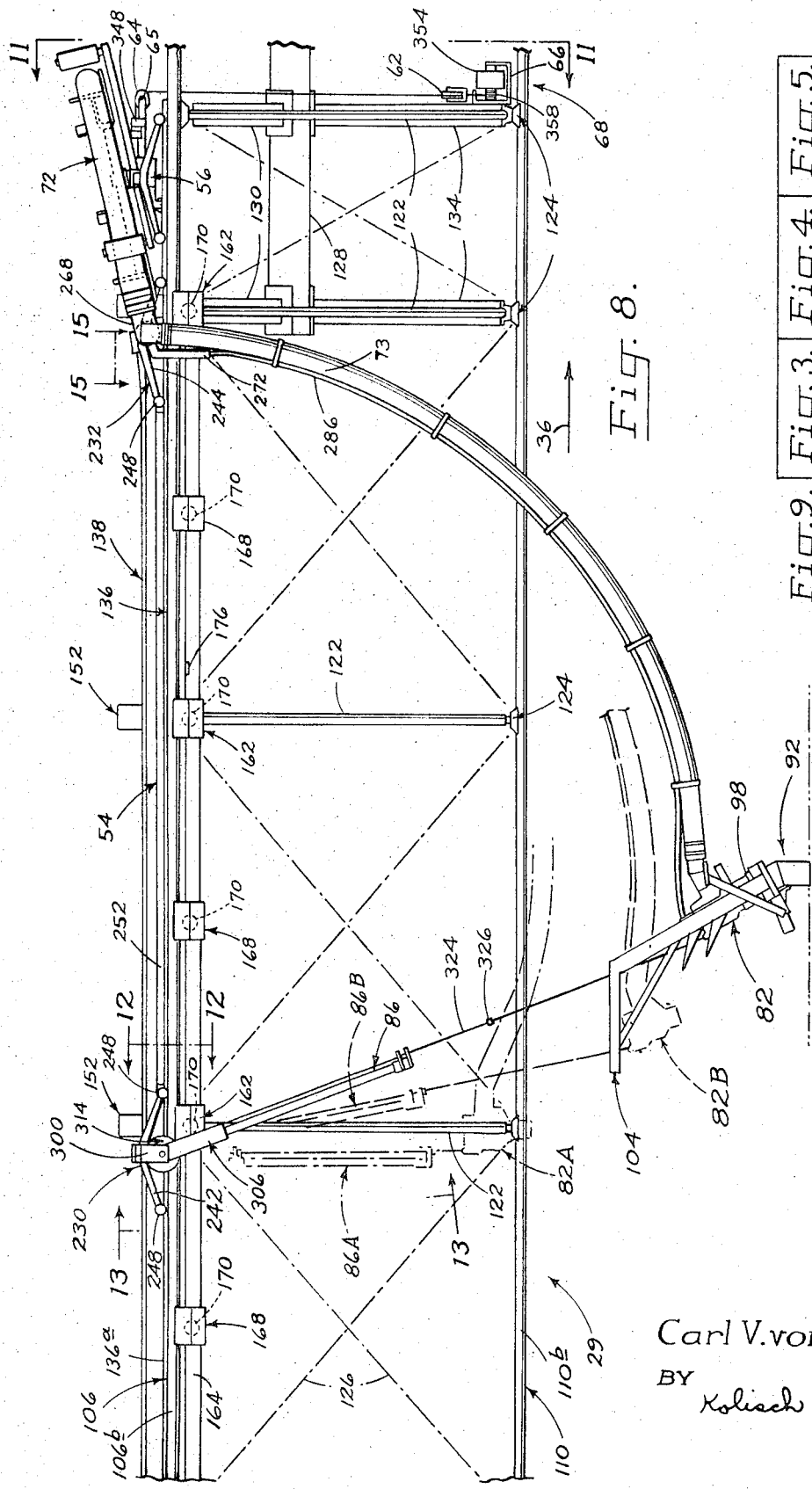

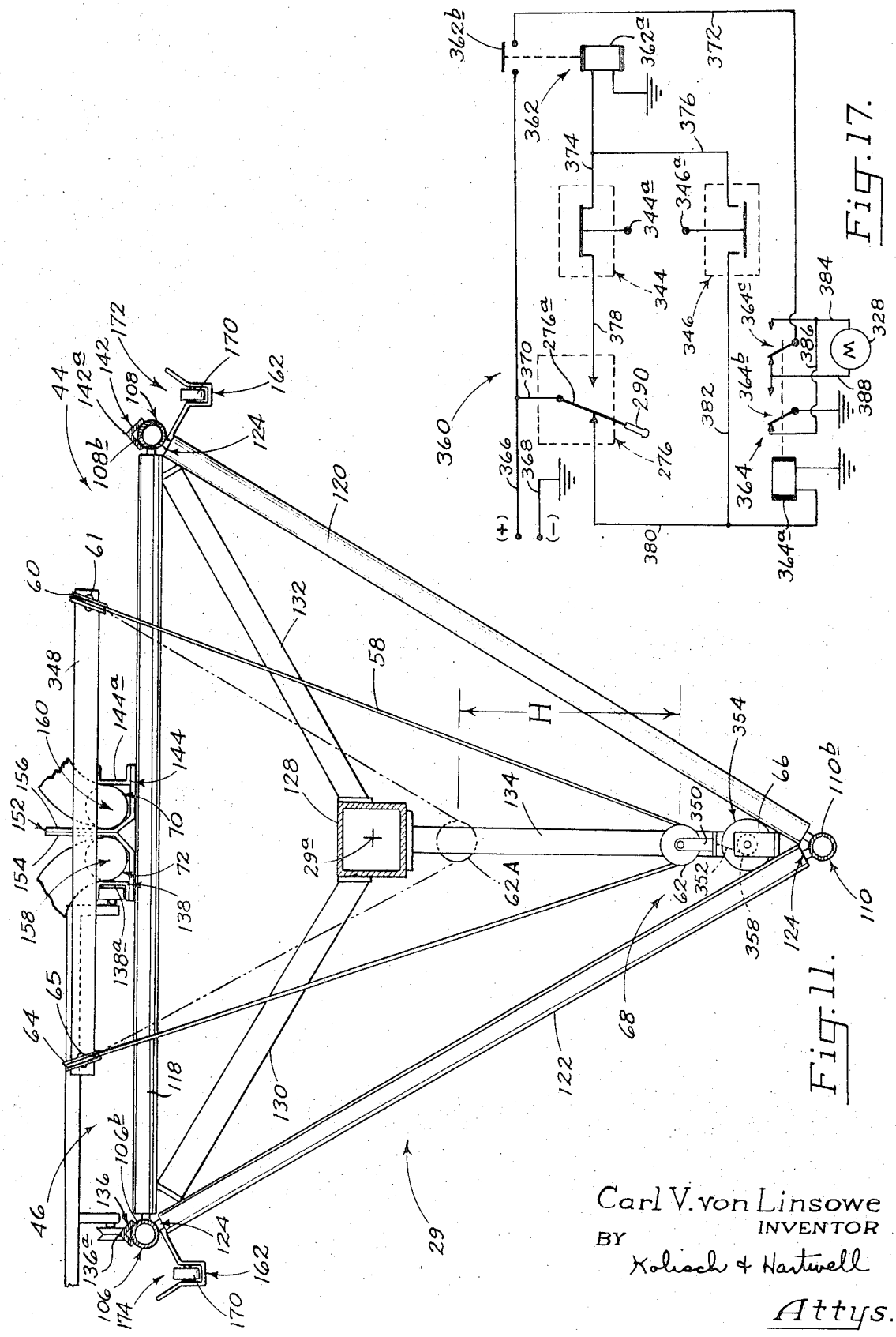

Patented April 24, 1973

Carl V. von Linsowe
INVENTOR
BY Kolisch & Hartwell
Attys.

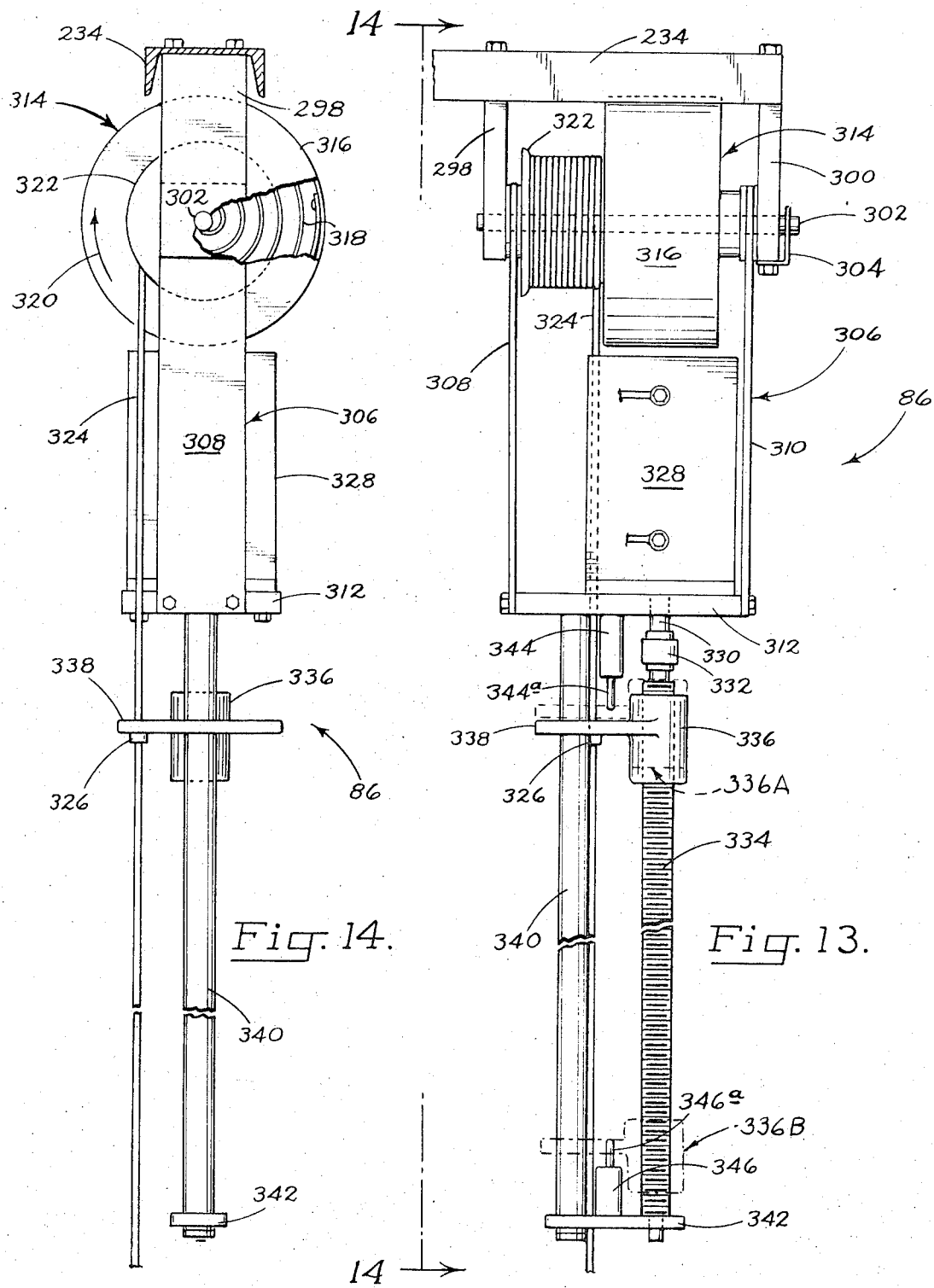

APPARATUS FOR PRODUCING A FLUID-FLOW CONNECTION BETWEEN RELATIVELY MOVABLE STATIONARY AND MOBILE CONDUIT SYSTEMS

BACKGROUND OF THE INVENTION

This application is a continuation of my prior-filed copending U.S. application, Ser. No. 14,455, filed Feb. 26, 1970, entitled "Apparatus for Producing a Continuous Fluid-Flow Connection Between Relatively Movable Stationary and Mobile Conduit Systems," now abandoned.

This invention pertains to an irrigation system including a stationary water supply having plural spaced-apart outlet couplings, and a mobile irrigator adapted to travel relative to the supply and to receive water from such couplings. More particularly, it pertains to apparatus on the irrigator for adjusting the positions thereon of a pair of relatively movable inlet couplings (which are interconnectable with the outlet couplings) with irrigator travel, whereby successive fluid-flow connections, and in some instances a continuous fluid-flow connection, are automatically produceable between the irrigator and the supply. For the purpose of illustration herein, a preferred embodiment of the invention is described in conjunction with inlet and outlet couplings which are adapted to interconnect and disconnect automatically, and with guide structure (adjacent an outlet coupling) which is adapted to guide an oncoming inlet coupling toward a position enabling interconnection thereof with the outlet coupling.

In present agricultural practices, field-irrigating with automated equipment has become an increasingly important factor. Preferably, such equipment is constructed to perform economically and reliably, and with minimal manual interference.

A typical automated irrigation system includes a stationary water supply having a plurality of spaced-apart outlet couplings, and a mobile irrigator which is adapted to receive water from the supply and to distribute the same over a field adjacent the supply. A difficulty in the past has been that such an irrigator must be stopped periodically to disconnect it from one outlet coupling in the supply, and to connect it to another outlet coupling, to accommodate advancement of the irrigator over the field. Such an operation, which may have to be performed a number of times in order completely to cover a field, is usually performed manually. The downtime required for such an operation, and the need for manual assistance, add to costs and inefficiencies.

SUMMARY OF THE INVENTION

A general object of the present invention, therefore, is to provide, in an irrigation system, novel apparatus which overcomes the drawbacks just mentioned in a practical and satisfactory manner.

More specifically, an object of the invention is to provide such apparatus which enables a mobile irrigator while traveling past successive outlet couplings in a stationary water supply, automatically and progressively to become connected to different successive outlet couplings in the supply.

According to a preferred embodiment of the invention, the proposed apparatus comprises a pair of relatively movable inlet couplings operatively connected to the water distribution system on the irrigator, and means mounting each coupling for reciprocal movement along a path substantially paralleling the course along which the irrigator travels. Also included in the apparatus is means operatively interconnecting the two inlet couplings constructed to produce related movement thereof, whereby movement of one of the couplings in one direction relative to the irrigator results in movement of the other inlet coupling in the opposite direction relative to the irrigator.

The inlet couplings are attached to the outer ends of flexible conduits which accommodate movement of the couplings, and the couplings are suspended from the frame of the irrigator through elongated support means which accommodate vertical movement of the couplings relative to the frame.

With one of the inlet couplings connected to an outlet coupling in the supply, and with the irrigator traveling in a certain direction relative to the supply, the other inlet coupling, through the operation of the interconnecting means mentioned, advances forwardly on the irrigator toward a position adjacent the next adjacent outlet coupling in the supply. With connection of this other inlet coupling and the next adjacent outlet coupling mentioned, and after disconnection of the couplings which were previously connected, similar action takes place with respect to the now disconnected inlet coupling.

In effect, therefore, the inlet couplings in the proposed apparatus "walk" on the irrigator, whereby as the irrigator advances along the supply, successive connections are made with successive outlet couplings in the supply. In a situation where adjacent outlet couplings are close enough together, such walking action maintains a continuous fluid-flow connection between the irrigator and supply. No manual interference is required, and the irrigator need not be stopped to accommodate such successive connections.

DESCRIPTION OF THE DRAWINGS

These and other objects and advantages attained by the invention will become more fully apparent as the description which follows is read in conjunction with the accompanying drawings, wherein:

FIG. 10 (sheet 6) is a chart illustrating how FIGS. 6, 7, and 8 may be arranged to show an overall side elevation of the several regions in the figures;

FIG. 11 (sheet 7) is an enlarged view, with portions removed, taken generally along the line 11—11 in FIG. 8;

FIG. 14 (sheet 9) is a view taken generally along the line 14—14 in FIG. 13;

FIG. 15 (sheet 4) is an enlarged fragmentary top plan view taken generally along the line 15—15 in FIG. 8;

FIG. 17 (sheet 7) is a schematic diagram of a circuit employed in the apparatus of the invention.

GENERAL DESCRIPTION

Figures 1, 2:
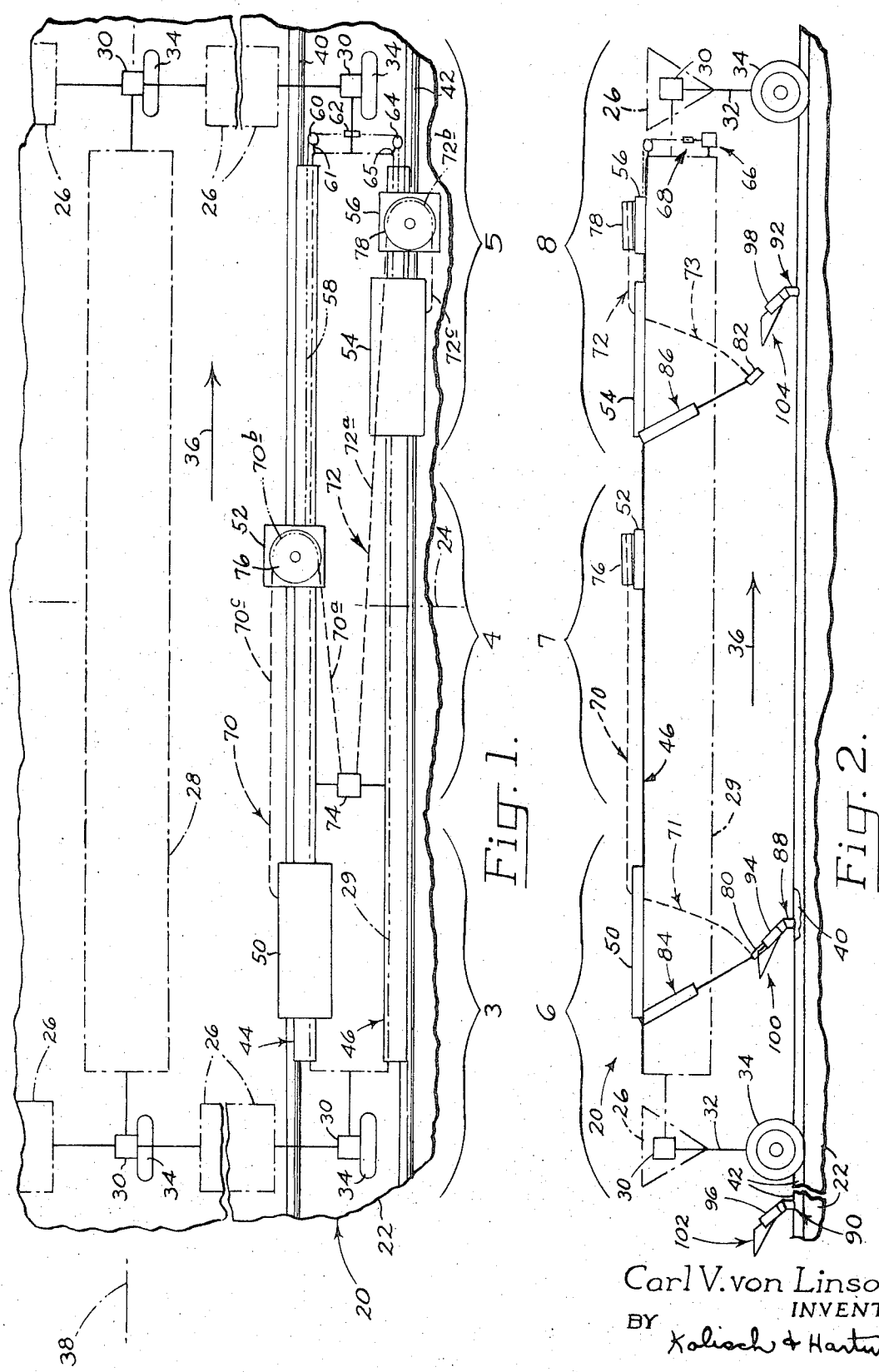
FIG. 1 is a greatly simplified fragmentary top plan view illustrating an irrigation system including a mobile irrigator and a stationary water supply and employing the invention.
FIG. 2 (sheet 1) is a simplified side elevation on the same scale as, and taken from the bottom side of, FIG. 1.

Turning now to the drawings, and referring first to FIGS. 1 and 2, indicated generally at 20 is an end portion of an elongated articulated mobile irrigator which extends over a field shown partially at 22. The longitudinal axis of irrigator 20 is shown by dash-dot line 24 in FIG. 1. In order to obtain better clarity in the drawings, irrigator 20 has been illustrated in greatly simplified form, and without regard to exact proportions.

In general terms, irrigator 20 includes a frame comprising a plurality of longitudinal trusses, shown in dash-dot lines at 26, disposed end-to-end and in two spaced parallel rows. Extending between the two rows of longitudinal trusses, from adjacent their confronting ends, are a plurality of transverse trusses, such as the two shown in dash-dot lines at 28, 29, which are substantially parallel to one another and at right angles to trusses 26. As can be seen in FIG. 2, each truss 26 has a triangular outline when viewed along its longitudinal axis. Similar outlines characterize axial views of the transverse trusses. Details of construction of the longitudinal and transverse trusses will be described later.

Adjacent sets of ends of longitudinal and transverse trusses are joined through suitable articulation means, such as those shown generally in block form at 30, which accommodate a certain amount of relative angular movement between the trusses to take care of unevenness in the ground. The trusses are supported above the ground, and for movement thereover, through upright legs 32 (see FIG. 2), and wheels 34 which are carried adjacent the lower ends of the legs. In irrigator 20, the longitudinal trusses are each about 120 feet long. Each transverse truss is about 90 feet long. Legs 32 support the trusses about 10 feet above the ground. The overall length of irrigator 20 is about one-quarter mile.

In the embodiment shown, irrigator 20 is propelled over the ground, generally in the direction of arrow 36, which is substantially normal to axis 24, by a suitable power-drive means (not shown). The frame of the irrigator may be thought of as having a travel axis, indicated by dash-dot line 38 in FIG. 1, which substantially parallels arrow 36. In the embodiment illustrated, irrigator 20 is propelled at a speed of about one mile per hour.

As will be more fully explained, the longitudinal and transverse trusses in the irrigator include tubes for carrying water to be supplied to suitable sprinkler devices (not shown) mounted adjacent the top sides of the longitudinal trusses. Such tubes constitute a mobile conduit system herein.

According to the invention, irrigator 20 is adapted while traveling over the ground to receive a supply of water from a stationary conduit system. More particularly, and in accordance with a preferred construction of the invention illustrated herein, the irrigator is adapted to receive a continuous water supply from the stationary system. The latter system, in the embodiment illustrated, comprises a pair of elongated parallel conduits 40, 42 which extend along a substantially straight course over the ground. These two conduits contain water under pressure. It should be understood that while a particular stationary conduit system is illustrated, such a system might take a number of different forms. For example, the system might comprise a single conduit only, or, whether single-conduit or dual-conduit in nature, it might extend along a curving course over the ground. In the organization being described, the drive means provided for irrigator 20 propels the same along a course or path, which substantially parallels that followed by conduits 40, 42.

Considering now the means employed to transfer water from conduits 40, 42 to the conduit system on irrigator 20, indicated generally at 44, 46 in FIG. 1 are elongated tracks which extend along and are located adjacent laterally opposite sides of truss 29. Tracks 44, 46 are disposed with their longitudinal axes substantially paralleling axis 38.

Mounted for reciprocation along track 44 are carriages shown in block form at 50, 52. Carriages shown in block form at 54, 56, corresponding to carriages 50, 52, respectively, are mounted for reciprocation along track 46. According to the invention, means is provided interconnecting carriages 52, 56 for related movement, such means including an elongated cable shown by a phantom line at 58. Opposite ends of cable 58 are connected to these two carriages respectively (by means which will be more fully described later). Progressing along the cable from cariage 52 to carriage 56, the cable is trained in succession about pulleys, or training means, 60, 62, 64. Pulleys 60, 64 are mounted (as will be more fully described) adjacent the right ends of tracks 44, 46, respectively, in FIG. 1 through swivels 61, 65, respectively. These swivels accommodate turning of the pulleys about swivel axes which are substantially normal to the pulleys' respective rotation axes. The swivel axes substantially parallel axis 38. Pulley 62 is positioned below pulleys 60, 64, and is urged downwardly by a biasing, or shock-absorbing, means indicated generally at 68 which is mounted on a bracket 66 anchored to truss 29. In general terms, biasing means 68 (which will be more fully described) yieldably tugs downwardly on pulley 62.

As a consequence of the interconnection just described between carriages 52, 56, with carriage 56 moved along track 46 in a direction to the left in FIG. 1, carriage 52 is pulled along track 44 substantially an equal distance to the right in FIG. 1. The reverse action takes place with carriage 52 moved to the left in FIG. 1 along track 44. Biasing means 68, among other things which will be explained, inhibits sudden rapid tension buildup in cable 58.

Indicated generally in dash lines at 70, 72 are elongated flexible hoses. The inner ends of the hoses are connected to a junction unit 74 (see FIG. 1) through which each of the hoses communicates with the conduit system on the irrigator. The junction unit is mounted on truss 29. From its inner end, or extremity, hose 70 extends in a reach 70a toward a reverse bend 70b which extends about a sheave 76 rotatably mounted on carriage 52. Thence, hose 70 extends in a reach 70c to its outer extremity which is anchored, in a manner which will be more fully described later, to carriage 50. A similar situation exists with respect to hose 72, with the same having reaches 72a, 72c corresponding to reaches 70a, 70c, respectively, and a reverse bend 72b corresponding to reverse bend 70b. Bend 72b extends about a sheave 78 rotatably mounted on carriage 56. The outer extremity of hose 72 is anchored to carriage 54. Carriages 52, 56 and sheaves 76, 78 are referred to herein collectively as movable guide means.

Connected to the outer extremity of hose 70, and in communication with such hose, is a flexible hose, or conduit section, 71 which depends from the right end of carriage 50 in FIG. 2. Similarly, a hose 73 which corresponds to hose 71, is connected to the outer extremity of hose 72, and depends from the right end of carriage 54 in FIG. 2. Attached to the outer (lower) ends of hoses 71, 73 are inlet couplings 80, 82, respectively, which are similar to one another in construction. Support means indicated generally at 84, 86 in FIG. 2 extends from couplings 80, 82, respectively, to the left ends of carriages of 50, 54, respectively, in FIG. 2. As will be more fully explained, these support means provide yieldable vertical support for couplings 80, 82, and together with hoses 71, 73 constitute suspending means herein. Support means 84, 86, hoses 71, 73, carriages 50, 54, and tracks 44, 46, are referred to herein collectively as mounting means.

Mounted on and extending upwardly from conduits 40, 42 at points spaced therealong, are outlet pipe assemblies, such as assembly 88 on conduit 40, and assemblies 90, 92 on conduit 42 (see FIG. 2). Progressing along conduits 40, 42, the outlet pipe assemblies on conduit 40 alternate with those on conduit 42. In addition, each outlet pipe assembly on a conduit herein is substantially equally spaced (at a maximum distance of about 60 feet in the system illustrated) from the next adjacent assembly on the other conduit. Suitably mounted on the tops of the various outlet pipe assemblies are outlet couplings such as couplings 94, 96, 98 on assemblies 88, 90, 92, respectively. The outlet couplings are similar to one another in construction.

In the irrigation system shown, the inlet and outlet couplings are of the self-connecting, self-releasing type. The particular inlet couplings employed herein are placeable selectively (through rotation of a changeover valve spool in the coupling) in either of two different operating conditions. With an inlet coupling placed in one operating condition, and occupying a certain position (which might be thought of as a ready-to-connect position) relative to an outlet coupling, the two couplings automatically become interconnected. With an inlet and outlet coupling interconnected, placing the inlet coupling in the other operating condition causes the couplings automatically to disconnect. Inlet and outlet couplings which perform in the manner just briefly indicated, are fully described in my issued U.S. Pat. No. 3,590,869, entitled "Pressure-Fluid-Assisted Apparatus for Disconnectably Coupling a Pair of Conduits". Other types of couplings may, of course, be used.

In the system illustrated, and by virtue of the relative lateral positioning existing between the irrigator and conduits 40, 42, inlet coupling 80 is adapted to interconnect with the outlet couplings mounted above conduit 40, and inlet coupling 82 is adapted to interconnect with the outlet couplings mounted above conduit 42. In FIG. 2, inlet coupling 80 is shown in a condition interconnected with outlet coupling 94. Inlet coupling 82 is shown in a position spaced to the left of outlet coupling 98.

Indicated generally by the triangular outlines shown at 100, 102, 104 in FIG. 2 are guide assemblies which are mounted adjacent outlet couplings 94, 96, 98, respectively. Thse guide assemblies, which may be of any suitable construction, are adapted, with movement of irrigator 20 in the direction of arrow 36, to capture and then guide an inlet coupling which is approaching an outlet coupling toward a ready-to-connect position enabling interconnection of the two couplings. One type of guide assembly which may be used for this purpose is described fully in my issued U.S. Pat. No. 3,599,683, entitled "Apparatus for Guiding Relatively Movable Interconnectable Fittings Into and Out of Connected Relation".

DETAILED DESCRIPTION

Figure 3:
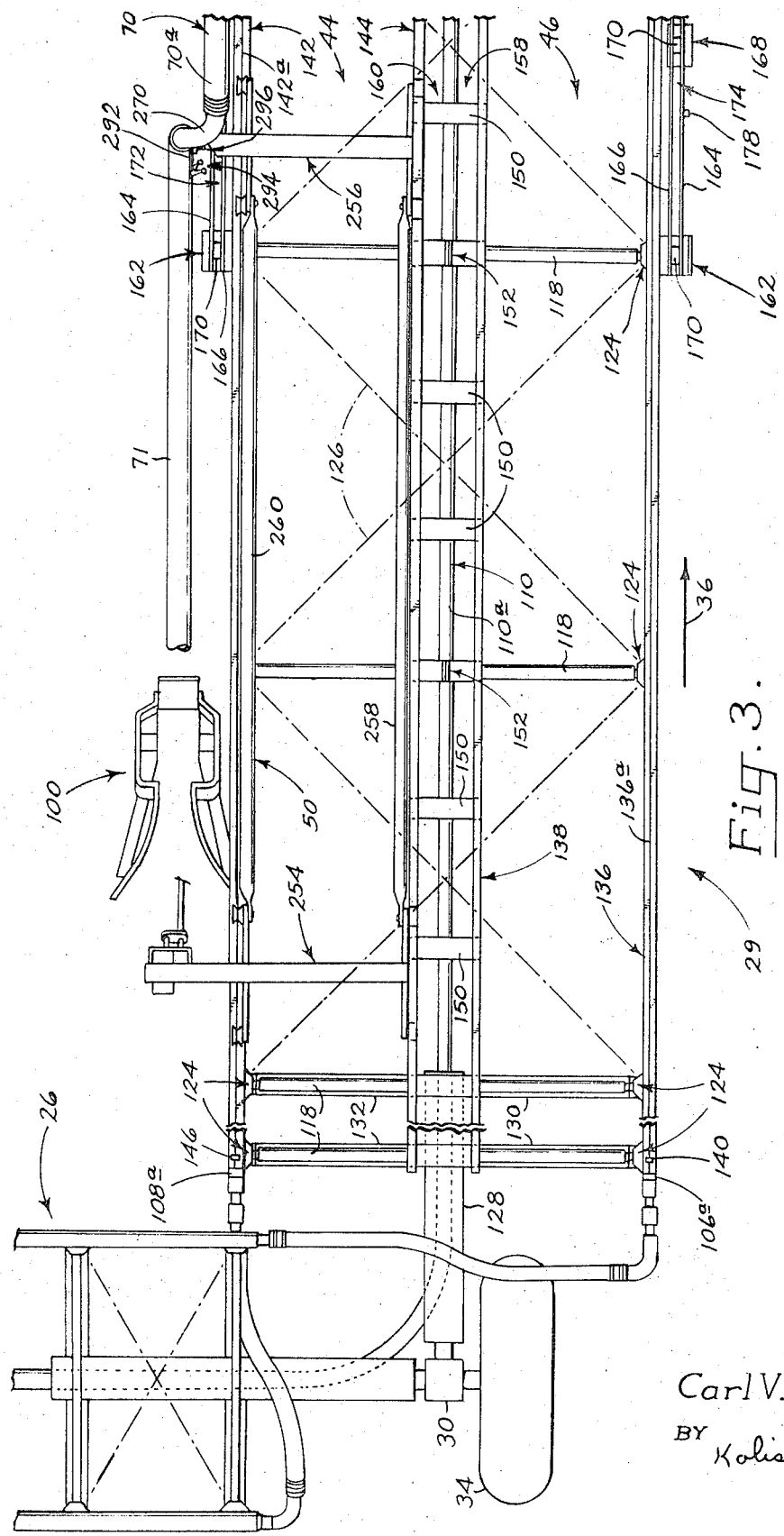
FIGS. 3 (sheet 2), 4 (sheet 3), and 5 (sheet 4), inclusive, are enlarged fragmentary top plan views, on substantially the same scale as one another, illustrating details of the respectively numbered bracketed regions marked off in FIG. 1.
Figure 4:
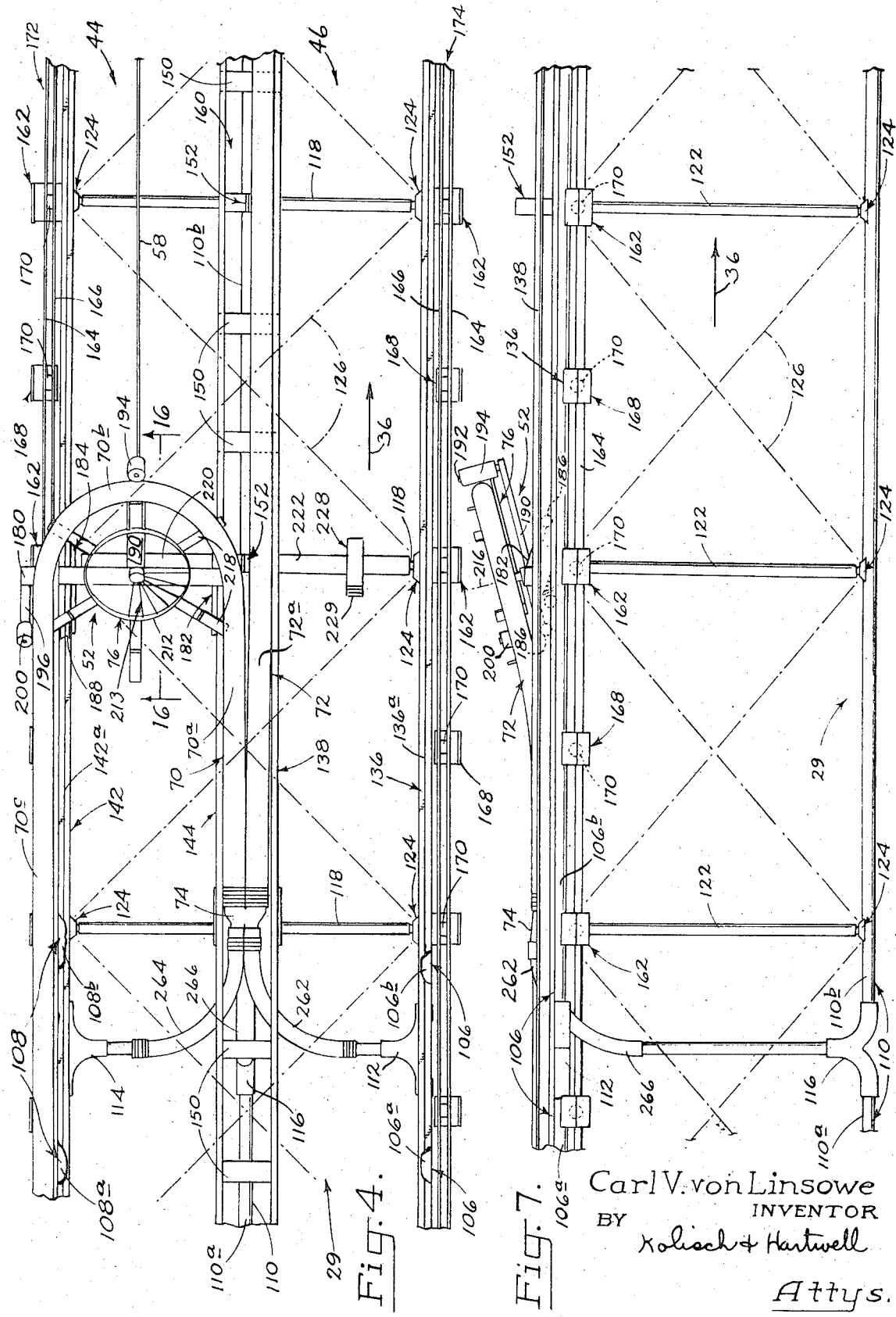

Referring to FIGS. 3–8, inclusive, and 11, truss 29 includes three elongated and spaced, substantially parallel rails 106, 108, 110. The truss has a neutral axis 29a (see FIG. 11) coinciding with its longitudinal axis. Each rail comprises a pair of axially aligned tubes, such as tubes 106a, 106b for rail 106, tubes 108a, 108b for rail 108, and tubes 110a, 110b for rail 110. As can be seen clearly in FIG. 11, the pairs of aligned tubes occupy the corners of a substantially equilateral triangle. Tubes 106a, 106b and 108a, 108b occupy a generally horizontal plane in the figures, and define the top of truss 29. Tubes 110a, 110b are centered between and disposed below the other tubes, and define the base of the truss. Referring particularly to FIGS. 4 and 7, it will be noted that adjacent sets of ends of the different pairs of aligned tubes are joined through Y-fittings, such as fitting 112 for tubes 106a, 106b, fitting 114 for tubes 108a, 108b, and fitting 116 for tubes 110a, 110b. Fittings 112, 114, 116 are rigid in construction, and are suitably anchored to their respective associated tubes.

The rails in each combination of two rails in truss 29 are supported in spaced-apart parallel relation by means of plural elongated struts which extend between and at right angles to the rails at positions distributed along the lengths thereof. Struts 118 are provided between the tubes making up rails 106, 108; struts 120 between the tubes making up rails 108, 110; and struts 122 between the tubes making up rails 110, 106. The struts may have any suitable cross-sectional configuration. Opposite ends of the struts join with the tubes forming the rails through mounts, such as those indicated generally at 124.

Also forming part of truss 29 are elongated cable tensors, such as those shown in dash-dot outline at 126 in FIGS. 3–8. The tensors are disposed in pairs in the rectangular spaces bounded by each combination of two rails and each pair of adjacent struts extending between such rails. The two tensors for a particular rectangular space extend at an angle relative to one another and diagonally across the space, with opposite ends of the tensors suitably anchored on mounts 124. The tensors are normally tensed, and serve to counteract deformation of truss 29.

Provided adjacent opposite ends of the rails in truss 29 are elongated load-transmitting members 128 through which the truss is connected to the two articulation means provided adjacent its opposite ends. Members 128 each have a cross-sectional outline such as that indicated in FIG. 11, and are disposed with their longitudinal axes substantially coinciding with axis 29a. Members 128 are each anchored in place through two sets of arms (spaced axially along axis 29a), with each set including arms 130, 132, 134. As can be seen in FIG. 11, the arms in a set extend radially from the outside of a member 128, with outer ends of the arms suitably anchored to a mount 124.

The other transverse trusses in irrigator 20, and the longitudinal trusses therein, are similar in construction to truss 29, except that in the cases of these other trusses, each rail therein is formed from a single continuous elongated tube. A more detailed description of a truss construction similar to that described herein for trusses 26, 28, 29 is found in U.S. Pat. No. 3,562,994, issued Feb. 16, 1971, entitled "Truss." The longitudinal and transverse trusses may, of course, be constructed in various different ways.

Figure 5:
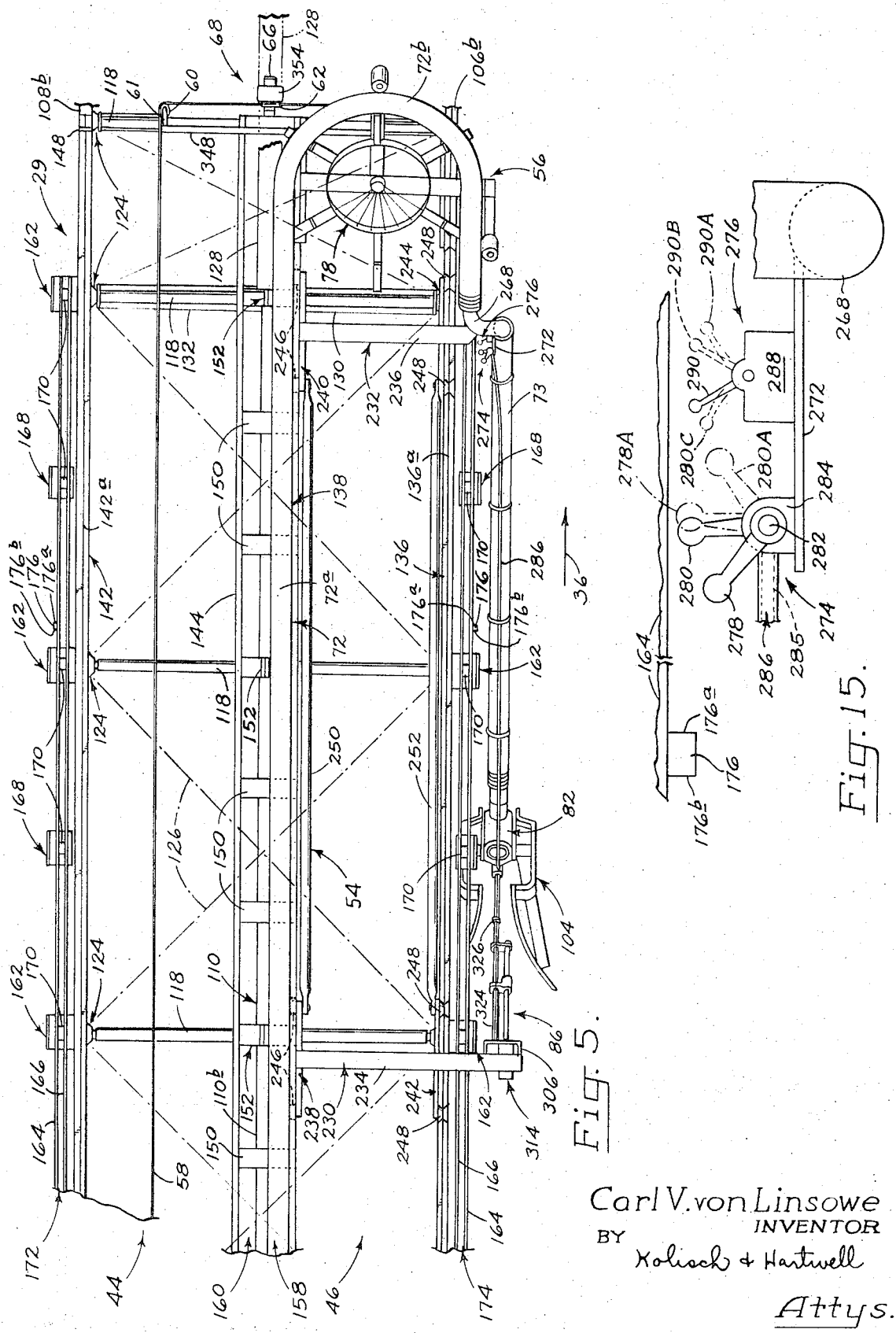
Figure 6:
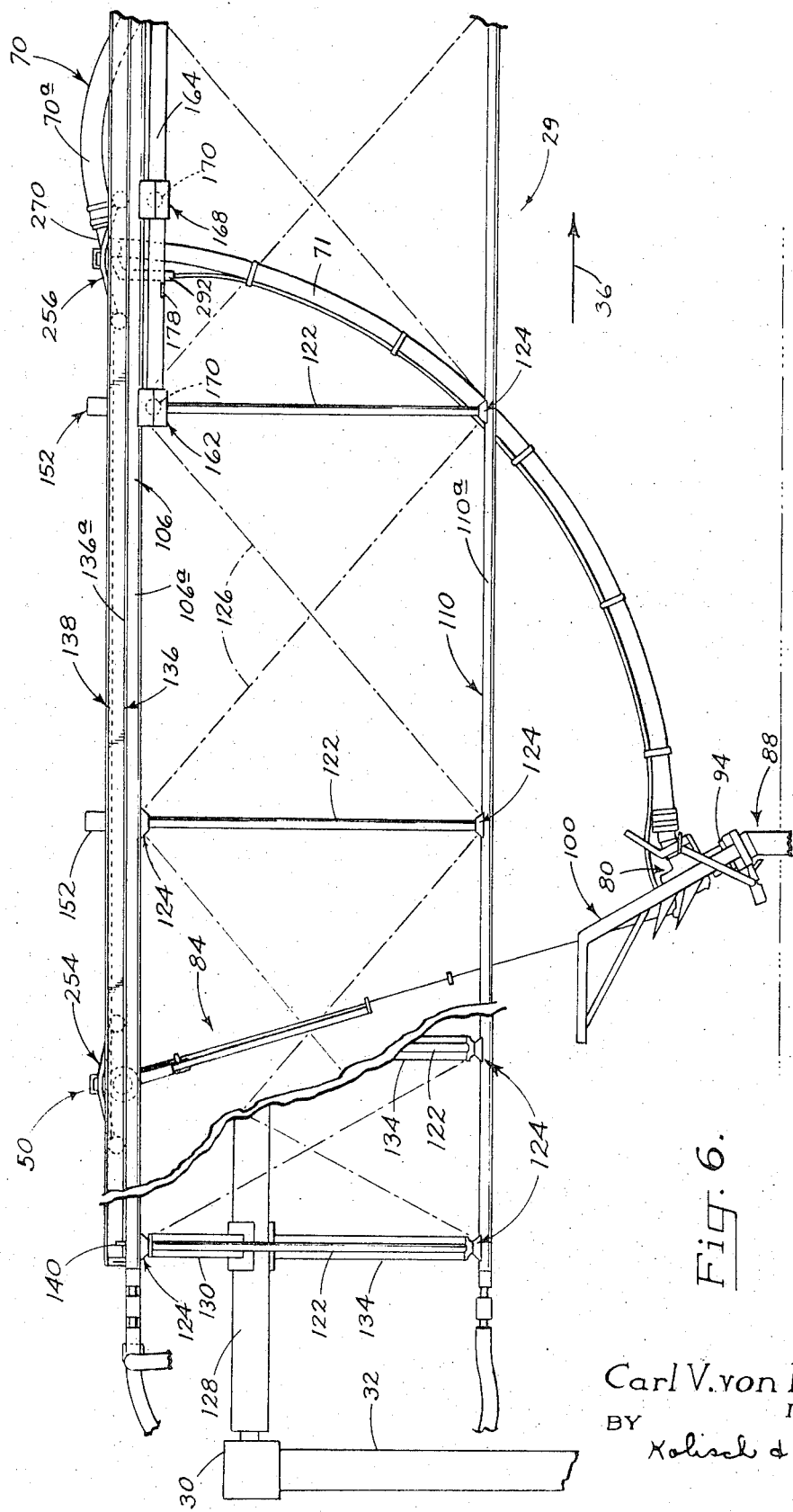
FIGS. 6 (sheet 5), 7 (sheet 3), and 8 (sheet 6), inclusive, are enlarged fragmentary side elevations, on substantially the same scale as FIGS. 3–5, illustrating details of the respectively numbered bracketed regions marked off in FIG. 2.

Considering now the construction of tracks 44, 46, and referring to FIGS. 3–8, inclusive, 11 and 12, track 46 includes an elongated angle iron member 136, and an elongated channel member 138. Members 136, 138 are referred to herein as rails in track 46. Member 136 extends along and is suitably fastened to the tops of tubes 106a, 106b, with its ridge 136a (i.e., the outside of the region where its two flanges join—see particularly FIGS. 11 and 12) facing upwardly. In the embodiment illustrated, member 136 is a single continuous piece which extends over fitting 112, with opposite ends of the member terminating just short of the outer opposite ends of tubes 106a, 106b. Suitably joined to the top side and adjacent the left end of member 136 in FIGS. 3 and 6 is a stop block 140. A similar block not illustrated in the drawings is provided adjacent the right end of member 136.

Channel member 138 is a single piece having substantially the same length as member 136, and is suitably anchored to the tops of struts 118 with its longitudinal axis spaced from and substantially paralleling the longitudinal axis of member 136. Member 138 is disposed with its groove 138a (see particularly FIG. 11) facing toward member 136.

Track 44 is similar in construction to track 46. Thus, track 44 includes an angle iron member 142 corresponding to angle iron member 136, and a channel member 144 corresponding to channel member 138. Member 142 is suitably anchored to the tops of tubes 108a, 108b, with its ridge 142a (see particularly FIG. 11) facing upwardly. Stop blocks 146, 148, similar to block 140, are provided adjacent the opposite ends of member 142 (see FIGS. 3 and 5). Channel member 144 is suitably anchored to the tops of struts 118, and is disposed with its groove 144a (see FIG. 11) facing toward member 142. The longitudinal axes of members 142, 144 substantially parallel the longitudinal axes of members 136, 138. It will be noted that channel members 138, 144 are spaced apart and disposed on opposite sides of the centers of struts 118.

Referring to FIGS. 3–5, extending between and suitably interconnecting the bottom sides of members 138, 144 at points spaced along the lengths thereof, and in regions intermediate adjacent struts 118, are cross members 150. These cross members provide lateral support for the channel members in the regions between struts 118.

Referring to FIGS. 3–8, inclusive and 11, provided at the regions where members 138, 144 extend over a strut are dividers, such as those shown at 152. With reference particularly to FIG. 11, it can be seen that each divider comprises a pair of plates, such as plates 154, 156, which are bent as illustrated. Plates 154, 156 are disposed in what might be thought of as back-to-back abutting relation, with their upright portions engaging one another and with their laterally outwardly extending portions disposed beneath and suitably joined to the bottom sides of members 138, 144. It will be noted that the upright portions of plates 154, 156 extend a substantial distance above the top flanges of members 138, 144. The elongated region indicated generally at 158 in FIGS. 3 and 11 which is partially bounded by member 138 and plates 150, 154, constitutes a channel herein. Similarly, the corresponding region indicated generally at 160 in FIGS. 3–5 and 11 partially bounded by members 144, 150, and plates 156 constitutes a channel. The purposes of channels 158, 160 will be more fully explained later.

Referring again to FIGS. 3–8, 11 and 12, suitably fastened to the mounts which are joined to tubes 106a, 106b, 108a, 108b in truss 29 are brackets 162. Referring to FIGS. 5 and 8, it will be noted that the brackets 162 which are the farthest to the right on truss 29 in the figures are located adjacent the opposite ends of the next-to-last strut 118 toward the end of truss 29 shown in the figures. Referring to FIGS. 3 and 6, it will be noted that the brackets 162 which are farthest to the left in these figures on truss 29 are located adjacent the opposite ends of a strut 118 which is positioned a substantial distance inwardly from the left end of truss 29 in the figures.

Figure 12:
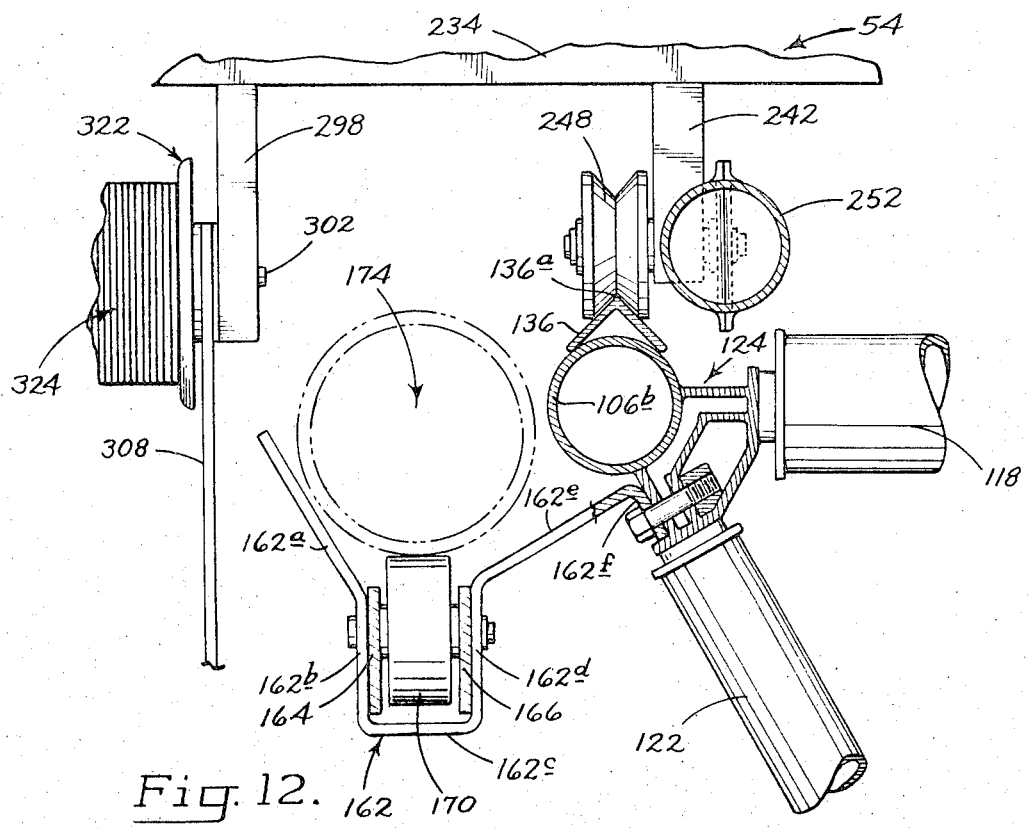
FIGS. 12 (sheet 8) and 13 (sheet 9) are enlarged fragmentary views taken generally along the lines 12—12 and 13—13 respectively, in FIG. 8.

Considering the construction of a bracket 162, and referring particularly to FIG. 12, the same is formed as a single piece including a portion 162a which slopes downwardly and to the right in the figure joining with the upper end of a portion 162b which occupies a substantially upright plane in the figure. The base of portion 162b joins with a substantially horizontal portion 162c, the right side of which in FIG. 12 joins with the base of a substantially upright portion 162d. Portions 162b, 162d substantially parallel one another. The top of portion 162d in FIG. 12 joins with a portion 162e which slopes upwardly and to the right in the figure. The right end of bracket portion 162e joins with a downwardly sloping portion 162f through which the bracket is fastened to a mount 124.

Suitably mounted on the confronting faces of bracket portions 162b, 162d, along both sides of truss 29, are elongated laterally spaced bars 164, 166, respectively. These bars are disposed with their longitudinal axes substantially paralleling axis 29a. The opposite sets of ends of these bars terminate at the locations shown in FIGS. 3 and 5.

Suitably mounted on each set of bars 162, 164, substantially centrally between adjacent brackets 162 are brackets 168. Brackets 168 are somewhat similar in construction to brackets 162, except that brackets 168 include only portions corresponding to bracket portions 162a–162d, inclusive.

Disposed between and journaled on each set of bars 164, 166, at the locations of brackets 162, 168 as shown, are rollers 170. These rollers are adapted to turn on axes which substantially parallel the longitudinal axes of struts 118.

The top sides of brackets 162, 168, bars 164, 166, and rollers 170 define along the outsides of tracks 44, 46, what may be thought of as channels indicated generally at 172, 174, respectively.

Referring to FIGS. 5, 8, and 15, suitably mounted on the outside surfaces of bars 164, and adjacent the right ends thereof in FIGS. 5 and 8, are cam elements, or means, 176.

Elements 176, also referred to as cams, are positioned adjacent the top edges of bars 164 (see particularly FIG. 8). Referring to FIG. 15, each cam includes opposed cam surfaces 176a, 176b which face to the right and to the left, respectively, in FIGS. 8 and 15. Cam surfaces 176a occupy a substantially common plane. The same is true with respect to cam surfaces 176b.

Considering FIGS. 3 and 6, suitably mounted on the outside surfaces, and adjacent the left ends in the figures, of bars 164 are cams, such as cam 178, which are similar in construction to cams 176. Cams 178 have opposed cam surfaces similar to those on cams 176, and are positioned adjacent the bottom edges of bars 164 (see particularly FIG. 6).

Figure 16:
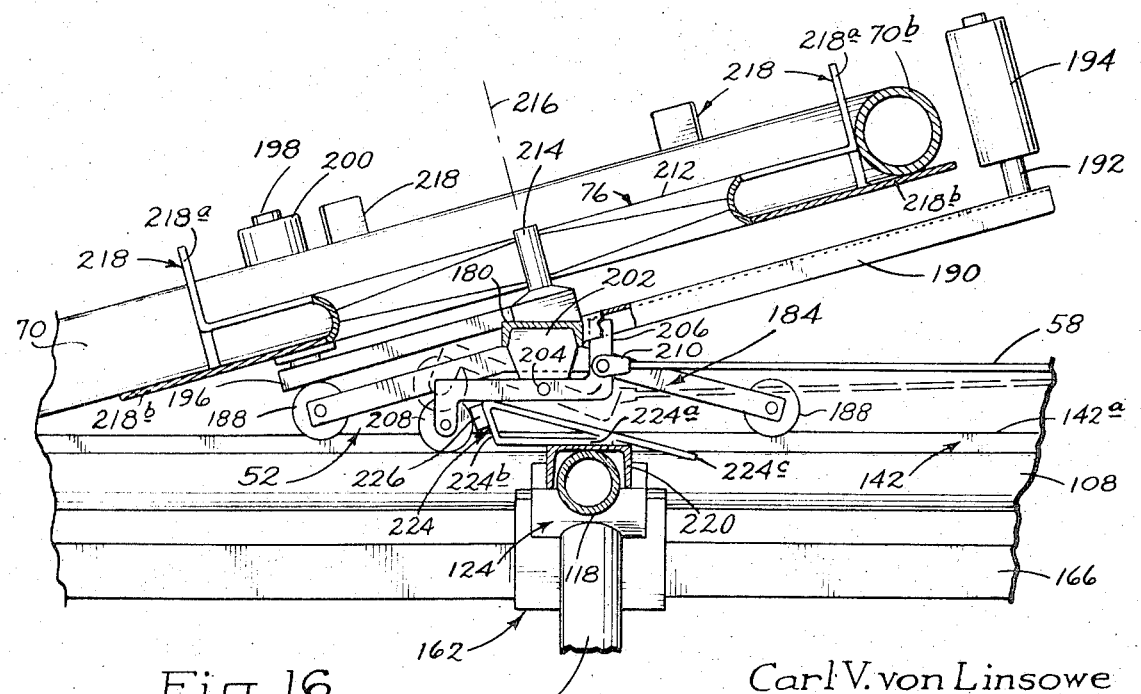
FIG. 16 (sheet 8) is an enlarged fragmentary view taken generally along the line 16—16 in FIG. 4.

Describing now in greater detail the construction of carriages 52, 56 and associated apparatus, carriage 52 is illustrated in FIGS. 4, 7, and 16. Carriage 52 comprises an elongated inverted channel member 180 which extends as shown transversely of axis 29a. Suitably joined to member 180 are inner and outer leg structures 182, 184, respectively. These two leg structures are similar in construction. Leg structure 182 carries a pair of rollers 186 (see FIG. 7) which are freely received within the grooved side of channel member 144 and which ride on the top surface of the bottom flange of this member. Leg structure 184 carries a pair of rollers 188 which ride on angle iron member 142. Rollers 188 have circumferential grooves on their peripheries which receive ridge 142a of member 142. Engagement of these grooves and the ridge inhibits lateral derailment of carriage 52.

Suitably joined to channel member 180 at the location illustrated in FIG. 4, and extending upwardly and to the right of this member in FIG. 16, is an elongated channel member 190. Mounted on the outer end of member 190 is an upwardly projecting pin 192 on which is journaled a guide roller 194. Joined to the end of member 180 which extends outwardly of truss 29 (the top end in FIG. 4) is an arm 196 which extends downwardly and to the left of member 180 in FIG. 16. On the outer end of arm 196 is an upwardly projecting pin 198 which rotatably supports a guide roller 200.

Secured to the bottom side of the central web of member 180, substantially centrally relative to the rails of track 44, is a downwardly projecting bracket 202 (see FIG. 16). Pivoted to bracket 202 through a pin 204 is a lever 206 having the angular side outline shown in FIG. 16. Pin 204 accommodates rocking of lever 206 about an axis substantially paralleling the longitudinal axis of member 180. The left end of lever 206 in FIG. 16 carries a roller 208. Lever 206 and roller 208 are referred to herein collectively as a latch. The end of cable 58 shown in FIG. 16 is attached to lever 206 at the position indicated in the figure through a fastener 210.

Normally, lever 206 and roller 208 occupy positions relative to carriage 52 such as those shown in solid outline in FIG. 16 for the lever and roller. The lever is prevented from swinging in a counterclockwise direction in FIG. 16 through engagement of its right end in the figure with the central web of member 190. Under circumstances which will be more fully described later, the lever and roller swing in a clockwise direction in FIG. 16 toward positions such as those illustrated in dashed outline in the figure.

Sheave 76 on carriage 52 includes a hub 212 which, in the embodiment illustrated, is similar in construction to the usual bicycle hub. Thus, the hub includes spokes, such as those shown at 213 in FIG. 4. Only a few spokes are shown in order to keep the drawing as simple as possible. The hub is rotatably supported on member 180 through an inclined pin 214. Pin 214 defines for the hub a rotational axis 216 which slopes upwardly and to the left in FIG. 16. Suitably joined to the periphery of, and at circumferentially spaced points on, hub 212 are hose supports 218 having the construction illustrated. These supports comprise upwardly projecting parts 218a, and radially outwardly extending parts 218b, which hold that portion of hose 70 which extends about sheave 76. The inclination of sheave 76, and the positioning of guide rollers 194, 200, cooperate to prevent hose 70 from accidentally slipping off supports 218.

Substantially the same constructions as those described for carriage 52 and sheave 76 characterize carriage 56 and sheave 78.

Still referring particularly to FIGS. 4, 7, and 16, suitably joined to the top side of the strut 118 which is shown in FIG. 16 are inverted channel members 220, 222. Member 220 extends between tube 108b and member 144. Member 222 extends between tube 106b and member 138. Joined to the top side of member 220, substantially centrally between its opposite ends, is an angular plate structure, or catch, 224 (see FIG. 16). Catch 224 includes a substantially horizontal plate 224a anchored to the top face of member 220, a plate 224b which slopes upwardly and to the left of FIG. 16 from the left edge of plate 224a, and a plate 224c which slopes downwardly and to the right from the top edge of plate 224b in FIG. 16. Mounted on the left face of plate 224b in FIG. 16 is a bumper 226 which engages roller 208 with the latter in its solid outline position.

A catch 228 similar to catch 224, and supporting a bumper 229 which is similar to bumper 226, is mounted substantially centrally on channel member 222 (see FIG. 4).

Considering now the constructions of carriages 50, 54, details of carriage 54 are illustrated in FIGS. 5 and 8. Carriage 54 includes a pair of end sections 230, 232 which are similar in many respects to carriages 52, 56.

Thus, end sections 230, 232 include inverted channel members 234, 236, respectively, which correspond to channel member 180, and inner and outer leg structures 238, 240 and 242, 244, respectively, which correspond to leg structures 182, 184, respectively. Inner leg structures 238, 240 carry rollers 246 (corresponding to rollers 186), which are received within the grooved side of channel member 138. Outer leg structures 242, 244 carry rollers 248 (substantially the same in construction as rollers 188) which ride on the ridge of angle iron member 136. Interconnecting end sections 230, 232 are elongated tie bars 250, 252 which are fastened to the inner and outer leg structures, respectively.

Carriage 50, which is illustrated in FIGS. 3 and 6, is substantially the same in construction as carriage 54. Thus, carriage 50 includes end sections 254, 256 that correspond to end sections 230, 232, respectively, interconnected by elongated tie bars 258, 260 which correspond to tie bars 250, 252.

Previously described stop blocks 140, 146, 148 inhibit longitudinal derailment of the various carriages.

Further describing now hoses 70, 72, and referring to FIGS. 4 and 5, the inner ends of these hoses connect as shown (in FIG. 4) with the inlet side of junction unit 74. The outlet side of junction 74 connects through pipes 262, 264, 266 to the inlet sides of Y-fittings 112, 114, 116, respectively. Referring to FIGS. 5 and 8, the outer end of hose 72 is connected to the upper end of a curved pipe 268 which is bent to the shape illustrated. Pipe 268 is anchored, as by welding, to the outer extremity of channel member 236 in carriage 54. The lower end of pipe 268 connects with the upper end of conduit section 73.

A similar organization is provided adjacent the outer end of hose 70. Thus, and referring to FIGS. 3 and 6, the outer end of hose 70 connects with a curved pipe 270 which corresponds to pipe 268. Pipe 270 is anchored, as by welding, to the outer extremity of the member in carriage 50 corresponding to channel member 236 in carriage 54. The lower end of pipe 270 connects with the upper end of conduit section 71.

Referring now to FIGS. 5, 8, and 15, anchored, as by welding, to pipe 268 is a substantially upright bracket 272. Bracket 272 is spaced closely adjacent the outside face of bar 164. Suitably mounted on the face of bracket 272 which confronts bar 164 are lever and switch mechanisms 274, 276, respectively.

Lever mechanism 274 includes a pair of vertically spaced levers 278, 280 which are anchored to a shaft 282 journaled in a bearing 284. Lever 278 is disposed above lever 280. With mechanism 274 viewed as in FIG. 15, levers 278, 280 are disposed at the angle shown relative to one another. The levers may occupy either of two sets of positions: one set being that shown for the levers in solid outline; and the other set being that shown in dash-dot outline, with the levers designated 278A, 280A. Lever 278 is disposed at substantially the same elevation as cams 176. Lever 280 is disposed at substantially the same elevation as cams 178. Shaft 282 is fastened coaxially to the upper end of the cable 285 in a conventional elongated torque cable assembly 286. As can be seen in FIG. 8 assembly 286 extends downwardly along and is strapped to conduit section 73. The lower end of the cable in this assembly is suitably connected to the changeover valve spool in inlet coupling 82.

Explaining briefly the operation of mechanism 274, with movement of carriage 54 to the right in FIG. 5 toward a position such as that shown for the carriage in the figure, mechanism 274 travels past cam 176. With the levers on such movement occupying their dash-dot outline positions in FIG. 15, lever 278 strikes cam surface 176b, with the two levers than adjusting to their solid outline positions in the figure. This turns cable 285 to adjust the changeover valve spool in coupling 82 to a position placing the coupling in a condition enabling automatic interconnection thereof with an outlet coupling. With movement of carriage 54 in the opposite direction (from the position in which it is shown in FIGS. 5 and 8) to shift mechanism 274 past cam 176, lever 278 clears the cam 176, and the two levers remain in their solid outline positions. This situation remains until lever 280 strikes cam 178 which, it will be recalled, is toward the other end of bar 164. When this occurs, the two levers shift to their dash-dot outline positions. Such shifting is effective to adjust the changeover valve spool in coupling 82 to another position—this latter position placing the coupling in a condition enabling disconnection thereof from an outlet coupling.

Switch mechanism, or means, 276 in FIG. 15 includes, in a housing 288, a conventional single-pole double-throw switch which is actuated by a movable arm 290. The shank of arm 290 is resilient, and the arm is positioned at substantially the same elevation as cam 176. With movement of carriage 54 to the left from its position in FIGS. 5, 8 and 15, arm 290 engages cam surface 176a, is bent to position 290A (see FIG. 15), and on passing cam 176, springs back to position 290B. With the arm in position 290B, movement of carriage 54 to the right to shift mechanism 276 past cam 176 results in arm 290 engaging cam surface 176b. With such engagement, the arm bends to position 290C in FIG. 15, and on passing the cam springs to its solid outline position in the figure. With arm 290 in its solid outline position, the switch in mechanism 276 is in one of its closed conditions; and with the arm in position 290B, the switch occupies its other closed condition.

Referring to FIGS. 3 and 6, a bracket 292 corresponding to bracket 272 is mounted in a similar fashion on pipe 270. This bracket carries a lever mechanism 294 and a switch mechanism 296 (see FIG. 3) which correspond to mechanisms 274, 276, respectively.

Describing now in detail the construction of the two support means 84, 86 mentioned earlier, support means 86 is shown more fully in FIGS. 8, 13, and 14. It will be noted that whereas in FIG. 8 parts of support means 86 are inclined relative to the vertical, in FIG. 14 the same parts are shown upright. This has been done in FIG. 14 to make better use of the space available on the sheet of drawings containing this figure. Referring particularly to FIGS. 13 and 14, support means 86 includes a pair of laterally spaced brackets 298, 300 which are fastened to and extend downwardly from the outer extremity of channel member 234 in carriage 54. Extending substantially horizontally between and mounted on these brackets is an elongated pin 302. A retainer 304 fastened to the bottom of bracket 300 anchors pin 302 in place. Rockably supported on pin 302 and depending therefrom is a generally U-shaped (as viewed in FIG. 13) swing frame 306. Frame 306 includes side pieces 308, 310 joined adjacent their bottom ends by a corss piece 312.

Mounted on pin 302 between the side pieces of frame 306 is a spring motor, or means 314. Motor 314, which is conventional in construction, includes a cylindrical housing 316 inside of which is disposed a coil spring 318. The housing is rotatably supported on pin 302. The inner end of spring 318 is suitably anchored to pin 302, and the outer end of the spring is suitably anchored to housing 316. Spring 318 acts between the pin and the housing, and tends to rotate the latter on the pin in the angular direction indicated by arrow 320 in FIG. 14. Formed on the left side of housing 316 in FIG. 13 is a reel 322 which turns as a unit with the housing.

Wound on reel 322 is an elongated cable, or tensioning means, 324 which has its inner extremity suitably anchored to the reel. Progressing from reel 322, cable 324 extends downwardly freely through a suitable accommodating bore in cross piece 312, and through other parts still to be described in support means 86. The outer extremity of cable 324 is suitably anchored to inlet coupling 82. Motor 314 and cable 324 are referred to herein collectively as a bias means. Suitably secured to cable 324 intermediate its ends is a lug 326 the purpose of which will be more fully explained.

Mounted on cross piece 312 beneath motor 314 in the figures is a reversible electric motor, or power-operated means, 328. The output shaft of motor 328, shown at 330, extends downwardly through a suitable accommodating bore in cross piece 312, and is drivingly connected through a coupling 332 to the upper end of an elongated drive screw 334. Mounted for travel on screw 334 is a rider 336 including an outwardly extending flange, or stop, 338. Flange 338 and motor 328 are referred to herein collectively as an adjustable limit means.

Joined to and extending downwardly from cross piece 312 is an elongated guide bar 340. Bar 340 is disposed with its longitudinal axis substantially parallel to that of screw 334. The guide bar extends freely through an accommodating bore provided in flange 338. Fastened to the bottom of bar 340 is a plate 342. The bottom end of screw 334 is suitably journaled on plate 342.

Progressing downwardly from cross piece 312, cable 324 extends freely through a suitable accommodating bore provided in flange 338. Lug 326 is disposed below flange 338 and is sufficiently large so that it cannot pass through the last-mentioned bore in the flange.

Referring particularly to FIG. 13, mounted on the bottom side of cross piece 312, and on the top side of plate 342, in the figure, are conventional normally closed spring-biased switches 344, 346, respectively. Switches 344, 346 have outwardly projecting actuating buttons 344a, 346a, respectively, which are positioned to be engaged by flange 338. With the rider fully raised as indicated in dashed outline at 336A, flange 338 engages button 344a and places switch 344 in an open state. With the rider fully lowered as indicated in dash-dot outline at 336B, the flange engages button 346a, placing switch 346 in an open state.

Describing briefly the operations of the parts just described in support means 86, spring 318 in motor 314 tends constantly to wind up cable 324 on drum 322. Thus, it tends to urge the cable to a position with lug 326 engaging the bottom side of flange 338. With operation of electric motor 328 in one direction, rider 336 shifts downwardly along screw 334 toward plate 342, with flange 338 acting downwardly against lug 326. This causes cable 324 to pay out from reel 322. With operation of motor 328 in the reverse direction, the reverse action takes place, with the spring in motor 314 taking up the cable on the drum.

Further describing the operation of support means 86, respective rotation axes. The swivel axes substantially parallel 200.

Secured to the bottom side of the central web of member 180, substantially centrally relative to the rails of track 44, is a downwardly projecting bracket 202 (see FIG. 16). Pivoted to bracket 202 through a pin 204 is a lever 206 having te angular side outline shown in FIG. 16. Pin 204 accommodates rocking of lever 206 about an axis substantially paralleling the longitudinal axis of member 180. The left end of lever 206 in FIG. 16 carries a roller 208. Lever 206 and roller 208 are referred to herein collectively as a latch. The end of cable 58 shown in FIG. 16 is is attached to lever 206 at the position indicated in the figure through a fastener 210.

Normally, lever 206 and roller 208 occupy positions relative to carriage 52 such as those shown in solid outline in FIG. 16 for the lever and roller. The lever is prevented from swinging in a counterclockwise direction in FIG. 16 through engagement of its right end in the figure with the central web of member 190. Under circumstances which will be more fully described later, the lever and roller swing in a clockwise direction in FIG. 16 toward positions such as those illustrated in dashed outline in the figure. and referring to FIGS. 8 and 13, with rider 336 in its fully raised position, and inlet coupling 82 disconnected from an outlet coupling, the inlet coupling is held in a position relative to truss 29 such as that position shown in dash-dot outline at 82A in FIG. 8. With such the case, support means 86 occupies a position such as that shown in dash-dot outline at 86A in FIG. 8.

With rider 336 in its fully lowered position, coupling 82 occupies a position as that shown for it at 82B in dashed outline in FIG. 8. Support means 86 in this case occupies a position such as that shown in 86B in dashed outline in the same figure.

With inlet coupling 82 interconnected with an outlet coupling as shown in solid outline in FIG. 8, support means 86 occupies a position such as that shown for it in solid outline in the same figure. It will be noted in this case that lug 326 is drawn downwardly away from the bottom side of flange 338. In FIG. 8, coupling 82 is shown in solid outline in a condition interconnected with outlet coupling 98 (contrary to the showing in FIG. 2) in order to simplify an explanation still to come of the operation of the apparatus as a whole.

Adjustment of the lower parts of support means 86 to the different positions shown in FIG. 8 is accommodated by rocking of frame 306.

Support means 84 which is provided for inlet coupling 80 is substantially the same in construction as support means 86.

Considering now in greater detail the means supporting and training cable 58, and referring to FIGS. 5, 8, and 11, suitably anchored to the top flanges of channel members 138, 144 adjacent their right ends in FIGS. 5 and 8 is an elongated bar 348. Bar 348 extends at substantially right angles to the longitudinal axes of these channel members. Previously mentioned swivels 61, 65 which support pulleys 60, 64 are mounted adjacent opposite ends of bar 348.

Pulley 62 is rotatably supported in a vertically movable frame 350, the bottom side of which is connected to the outer end of a cable 352. Indicated at 354 is a spring motor which is substantially the same in construction as motor 314. Motor 354 is mounted on previously mentioned bracket 66 which is suitably anchored to the bottom end of the arm 134 which is closest to the right end of truss 29 in FIGS. 5 and 8. Cable 352 is wound on a reel 358 which corresponds to previously described reel 322. The spring in motor 354 tends to wind up cable 352 on reel 358, and to hold pulley 62 and frame 350 in lowered positions such as those illustrated therefor in solid outline in FIG. 11. With tensing of cable 58, pulley 62 moves upwardly against the action of the spring in motor 354. In the embodiment illustrated, pulley 62 may move a vertical distance such as that illustrated at H in FIG. 11 to a position such as that shown at 62A in phantom outline.

Turning now to FIG. 17, indicated generally at 360 is a circuit which is employed for controlling the operation of motor 328. In addition to including motor 328, switch mechanism 276 and switches 344, 346, circuit 360 also includes a pair of relays 362, 364. Relay 362 includes a solenoid 362a which is ganged to the movable contact of a normally open switch 362b. Relay 364 includes a solenoid 364a ganged to the movable contacts of a pair of single-pole double-throw switches 364b, 364c.

At 366 is a positive voltage suply conductor which is connected to the positive terminal of a suitable source of DC voltage. This source might typically be a battery, and may be mounted at any suitable location on the frame of irrigator 20. The negative side of the source is grounded through a conductor 268. Conductor 366 is connected to one side of switch 362b, and is connected through a conductor 370 to the movable contact 276a of switch mechanism 276. Contact 276a is suitably joined to previously mentioned arm 290. The other side of switch 362b is connected through a conductor 372 to the movable arm of switch 364c.

One end of solenoid 362a is grounded, and the other end is connected through a conductor 374 to one side of switch 344. A conductor 376 connects conductor 374 to one sde of switch 346. The other side of switch 344 is connected through a conductor 378 to the right side of the switch in mechanism 276 in FIG. 17. The left side of this switch is connected through a conductor 380 to one end of solenoid 364a. The other end of solenoid 364a is grounded. A conductor 382 connects conductor 380 to the left side of switch 346 in FIG. 17.

One side of motor 328 is connected through a conductor 384 to the right side of switch 364c in FIG. 17, and is connected through conductor 384 and a conductor 386 to the left side of switch 364b. The adjacent sides of switches 364b, 364c in FIG. 17 are connected together, and are connected through a conductor 388 to the other side of motor 328.

A circuit similar to circuit 360 is provided for controlling the operation of the electric motor (corresponding to motor 328) provided in support means 84.

DESCRIPTION OF OPERATION

Explaining now how the apparatus described herein performs as a whole, and considering the conditions of the various parts in the apparatus as such are shown in FIGS. 3–17, carriage 50 is adjacent the left end of track 44 and carriage 52 is disposed over catch 224. Lever 206 and roller 208 occupy the positions shown therefor in solid outline in FIG. 16.

Lever mechanism 294 on bracket 292 is positioned to the left in FIG. 3 of the cam 178 (obscured) on the upper rail 164 in the figure. As a consequence, the levers in mechanism 294 occupy positions corresponding to those shown in dash-dot outline in FIG. 15 for the levers in mechanism 274. With the levers in mechanism 294 in such positions, the changeover valve spool in inlet coupling 80 is in a position placing the coupling in a condition enabling it automatically to disconnect from outlet coupling 94.

The various movable parts in circuit 360 occupy the positions in which they are shown in FIG. 17. Solenoid 362a is nonenergized and switch 362b is open. Solenoid 364a is energized. Motor 328 is stopped. Rider 336 is fully lowered with flange 338 engaging button 346a. Switch 346 is open. Contact 276a of switch mechanism 276 is in the position which it occupies with arm 290 in its solid outline position in FIG. 15.

In the circuit (corresponding to circuit 360) provided for controlling the operation of the motor in support means 84, the conditions are somewhat different from those just described for circuit 360. More specifically, the condition of the switch in mechanism 296 is the reverse of that of the switch in mechanism 276. In addition, the rider in support means 84 is fully raised, with the switch corresponding to switch 344 held open. The switch corresponding to switch 346 is closed. As a consequence, the solenoids corresponding to solenoids 362a, 364a, and the motor, are nonenergized.

Considering FIGS. 5, 8 and 15, let us assume that inlet coupling 82 has just become automatically interconnected with outlet coupling 98. As will become apparent from a full description of the operation, in the apparatus set forth herein interconnection between couplings 82, 98 occurs prior to placement of coupling 80 in a condition enabling disconnection with outlet coupling 94. This results from the spacing between and relative positioning of cams 176, 178 as compared with the spacing between and relative positioning of adjacent outlet couplings. Such operation insures a continuous supply of water to the water distribution system on the irrigator.

Pulley 62 occupies the position shown for it in solid outline in FIG. 11.

Under these circumstances, inlet couplings 80, 82 occupy one set of spaced-apart conditions relative to truss 29, with the couplings being spaced apart by the distance between outlet couplings 94, 98.

With travel of the irrigator in the direction of arrow 36, carriage 54 remains in a substantially fixed position over couplings 82, 98 (such position being illustrated in FIGS. 5 and 8). Carriage 56 travels in the direction of arrow 36 at a speed relative to the ground which is approximately half that of the ground speed of the irrigator. Thus, and with reference to track 46, carriage 54 moves relatively thereon in a direction opposite arrow 36 at substantially the full ground speed of the irrigator; and carriage 56 moves relatively therealong in the same direction as carriage 54, but at approximately one-half the speed thereof.

As carriages 54, 56 so move on track 46, sheave 78 picks up successive portions of the inner reach of hose 72 lying in channel 158, and carriage 54 pulls the outer reach of the hose 72 into and along channel 174. It will be noted that channel 158 is constructed freely to accommodate lateral shifting of the hose toward the sheave. Portions 162a of brackets 162 prevent the hose from slipping out of channel 174. With such carriage movement, cable 58 tenses, and pulley 62 raises. On a sufficient tension buildup occurring in cable 58, and referring particularly to FIG. 16, lever 206 and roller 208 shift toward their dashed outline positions. When this occurs, carriage 52 is free to move on track 44 in a direction to the right in FIG. 16 (it being recalled that inlet coupling 80 is not disconnected from outlet coupling 94); and on carriage 52 so moving, inlet coupling 80 pulls free of outlet coupling 94 and guide assembly 100.

It will be apparent that pulley 62 and bias means 68 acting thereon not only insure proper tension buildup in cable 58 to effect the release just mentioned, but also inhibit overstressing in the cable and in the flexible hoses during the interval when both inlet couplings are connected to an outlet coupling. Another important function of this pulley and bias means will shortly be discussed.

On disengagement of couplings 80, 94, the spring motor in support means 84 pulls coupling 80 upwardly to a vertical position such as that illustrated at 82A in FIG. 8 for coupling 82. Such raising of the inlet coupling minimizes the chance that it will be damaged by any tall obstructions on the ground as the irrigator advances.

With carriage 56 traveling on track 46 in the manner described earlier, and referring to FIG. 15, switch mechanism 276 travels in a relative direction to the left in FIG. 15 past cam 176. This results in arm 290 switching to position 290B. Referring to FIG. 17, such adjustment of arm 290 reslts in contact 276 reversing its position, and completing a circuit energizing solenoid 362a. Solenoid 364a thereupon deenergizes, with the movable contacts in switches 364b, 364c reversing their positions. On energizing of solenoid 362a, switch 362b closes and energizes motor 328. The motor then operates in a direction raising rider 336 toward a fully raised position. Flange 338 disengages button 346a, with switch 346 then closing, and ultimately engages button 344a. With engagement of the flange and button 344a, switch 344 opens breaking the circuit energizing solenoid 362a. Thereupon, switch 362b opens and motor 328 stops.

With carriage 52 released for movement on track 44 as described above, the carriage is pulled in the direction of arrow 36 along the track because of its interconnection with carriage 56 through cable 58. Carriage 52 travles at a speed relative to the ground which is about one and one-half times the ground speed of the irrigator. As carriage 52 so moves sheave 76 takes up successive portions of the outer reach of hose 70 (which reach is lying in channel 172), and stores the inner reach of the hose in channel 160.

In addition, as carriage 52 moves in the manner described on track 44, carriage 50 also moves on this track (due to tension in the outer reach of hose 70). In particular, carriage 50 travles in the same direction as arrow 36, and at a speed relative to the ground which is approximately twice the travel speed of the irrigator.

As the irrigator continues to travel, hose 70 is taken up and stored in channel 160 with carriages 50, 52 moving toward relative positions on track 44 similar to those positions illustrated in FIGS. 5 and 8 for carriages 54, 56, respectively. Hose 76 is paid out from channel 158 and extended along and in channel 174, with carriages 54, 56 moving toward relative positions on track 46 which correspond to the positions shown for carriages 50, 52, respectively, in FIGS. 3, 4, 7 and 8. Carriage 56 moves toward a position on track 46 with the latch carried by it (corresponding to the latch described on carriage 52) engaged with catch 228.

With movement of carriage 50 as described, lever mechanism 294 and switch mechanism 296 travel to the right in FIG. 5 past the upper cam element 176 in the figure. This results in the levers in mechanism 294 and the arm in mechanism 296 adjusting to positions corresponding to those positions shown in solid outline in FIG. 15 for the levers and arm of mechanism 274, 276, respectively. It should be noted that because of the relative positioning of cams 176, 178, such adjustment of the positions of the levers and arm occurs with inlet coupling 80 still positioned a substantial distance from the next successive outlet coupling above conduit 40.

Considering the adjustment made in switch mechanism 296, this results in the solenoids mentioned earlier that correspond to solenoids 362a, 364a energizing, and the motor in support means 84 corresponding to motor 328 operating in a direction lowering the rider in the support means. With such action, inlet coupling 80 is lowered to a position similar to that shown at 82B in FIG. 8 for coupling 82. Such lowering of the inlet coupling is effective to place it at a proper elevation for engaging the guide assembly provided for the next adjacent outlet coupling above conduit 40.

Adjustment of the levers in mechanism 294 results in the changeover valve spool in coupling 80 placing the coupling in a condition enabling automatic interconnection thereof with an outlet coupling.

With continued travel of the irrigator, the two inlet couplings are adjusted to another set of spaced-apart positions relative to truss 29, which positions are the reverse of those occupied just as coupling 82 interconnected with coupling 92. Coupling 80 is captured by the guide assembly, and is drawn toward a ready-to-connect position enabling interconnection with the next outlet coupling. With the latch on carriage 56 engaged with catch 228, and with continued travel of the irrigator, tension builds up in cable 58 and in the spring of motor 354, and assures an adequate force on the coupling to move it to such a ready-to-connect position.

As mentioned earlier, because of the positioning of cams 176, 178, interconnection of inlet coupling 80 with an outlet coupling, as just described, occurs prior to coupling 82 being placed in a condition enabling disconnection thereof from outelt coupling 98. A short interval after coupling 80 becomes interconnected with the next outlet coupling, lever mechanism 274 travels relatively past cam 178 to place coupling 82 in such a condition. Tension buildup in cable 58 continues until the latch and catch associated with carriage 56 disengage, freeing the carriage for return movement along track 46.

An operation similar to that just described then takes place with the carriages and the inlet couplings returning toward the same relative positions in which they are shown on the irrigator in FIGS. 3–8.

What has just been described is a preferable operating mode for the proposed apparatus, wherein a free inlet coupling becomes interconnected (automatically) with an outlet coupling prior to the last-interconnected inlet and outlet couplings becoming disconnected. This type of operation results from the fact (due to the spacing and relative positioning of cams 176, 178) that a free inlet coupling always is placed in a condition ready to connect with an outlet coupling, before the last-connected inlet coupling is placed in a condition producing disconnection with an outlet coupling. Such operation, in addition, results from the fact that adjacent outlet couplings in the stationary water supply are sufficiently close to one another.

Another operating mode, somewhat similar to that just explained, occurs where adjacent outlet couplings are too far apart, relative to the length of the proposed apparatus, to permit the continuous supply of water to the mobile system. In such a case, connection of an inlet and outlet coupling, and travel of the irrigator, produce movement of the free inlet coupling just as previously described toward the next adjacent outlet coupling. However, before this free inlet coupling becomes interconnected with the next outlet coupling, the last connected inlet and outlet couplings become disconnected. The irrigator continues to travel until the forward-most free inlet coupling is in a ready-to-connect position relative to the next outlet coupling. Interengagement of a latch and catch in the apparatus produces sufficient tension in cable 58 to assure a sufficient reaction force for the forward-most inlet coupling enabling it to become interconnected with the next outlet coupling. The bias means which acts on cable 58 prevents overstressing.

It will thus be apparent that while, in this other operating mode described for the apparatus, a continuous flow connection does not result, successive automatic interconnections between inlet and outlet couplings do occur. Thus, regardless of whether outlet couplings are spaced close enough to permit the continuous supply of water, or are too far apart to permit such operation, the apparatus contemplated herein nevertheless functions to produce successive automatic interconnections between the stationary and mobile systems.

Thus, the invention provides novel apparatus for producing a fluid-flow connection between a stationary and a mobile conduit system. As the mobile conduit system travels, successive connections and disconnections occur between the two inlet couplings provided therefor and the multiple spaced outlet couplings in the stationary system. In effect, the two inlet couplings "walk" back and forth relative to the mobile system as the same travels to produce proper relative positioning between these couplings enabling such successive connections and disconnections.

While a preferred embodiment of the apparatus has been described, it is appreciated that variations and modifications are possible without departing from the spirit of the invention.

It is claimed and desired to secure by letters patent:

1. Apparatus for producing successive fluid-flow connections between a stationary conduit system having a plurality of outlet couplings spaced along a course accommodating a connection with the system and a mobile conduit system supported in a frame traveling in one direction relative to said stationary system along another course adjacent and generally paralleling said first-mentioned course, said frame having a travel axis which at any given time substantially parallels said other course, said apparatus comprising a pair of relatively movable inlet couplings operatively connected to said mobile system, each adapted to be coupled releasably to an outlet coupling in said stationary system with said frame traveling along said other course, mounting means for each inlet coupling mounting the same on said frame for reciprocal movement along a path substantially paralleling said other course, the mounting means for the two inlet couplings comprising a pair of elongated tracks, and carriages supported for movement therealong, such mounting means accommodating adjustment of the inlet couplings to two different spaced-apart conditions, with the inlet couplings in said two different conditions occupying reversed positions, and interconnecting means mounted on said frame operatively interconnecting said inlet couplings, and constructed to produce related movement thereof, whereby movement of an inlet coupling in one direction relative to said frame results in movement of the other inlet coupling in the opposite direction relative to the frame, said interconnecting means permitting adjustment of the inlet couplings to said two different spaced-apart conditions.

2. The apparatus of claim 1, wherein each carriage is above said outlet couplings in said stationary conduit system with said frame traveling along said other course, and the mounting means for an inlet coupling further comprises suspending means suspending the inlet coupling from the carriage associated therewith.

3. The apparatus of claim 2, wherein said suspending means comprises an elongated flexible conduit section attached to and extending between the inlet coupling and said carriage accommodating fluid flow between such coupling and said mobile conduit system.

4. The apparatus of claim 3, wherein said flexible conduit section extends from the inlet coupling toward one end of said carriage, and said suspending means further comprises elongated support means attached to, and extending between the inlet coupling and the other end of said carriage.

5. The apparatus of claim 4, wherein the carriage's said one end is spaced from its said other end in said one direction.

6. The apparatus of claim 4, wherein said support means is constructed to accommodate movement of said inlet coupling toward and away from said other end of said carriage.

7. The apparatus of claim 6, wherein said support means comprises bias means operatively interposed between said inlet coupling and said carriage's said other end urging said inlet coupling toward said other end.

8. The apparatus of claim 7, wherein said support means further comprises adjustable limit means limiting movement of said inlet coupling toward said other end of said carriage.

9. The apparatus of claim 7, wherein said bias means comprises elongated tensioning means having one extremity fastened to said inlet coupling, and spring means operatively interconnecting the other extremity of said tensioning means and said other end of said carriage.

10. The apparatus of claim 9, wherein said elongated tensioning means is reelable, and said spring means comprises a reel mounted for rotation adjacent said other end of said carriage and attached to said other extremity of said tensioning means, and a spring acting on and urging rotation of said reel in one angular direction.

11. The apparatus of claim 9, wherein said support means further comprises adjustable limit means limiting movement of said inlet coupling toward the other end of said carriage.

12. The apparatus of claim 11, wherein there is a lug joined to said elongated tensioning means intermediate its extremities, and said adjustable limit means comprises a movable stop which is adjustable to different positions for releasably engaging said lug.

13. The apparatus of claim 12, wherein said adjustable limit means further comprises power-operated means operatively connected to said stop and operable to adjust the position of the same.

14. The apparatus of claim 13, wherein said power-operated means comprises a reversible electric motor, and said apparatus further comprises switch means operatively connected to said motor having one position wherein it effects operation of the motor in one direction to shift said limit means away from said other end of said carriage, and adjustable to another position wherein it effects a reverse operation, and cam means mounted on said frame for adjusting the position of said switch means with movement of said carriage on said track.

15. The apparatus of claim 14, wherein said switch means has a movable arm, and said cam means comprises an element having a pair of cam surfaces spaced along said track engageable with said arm, said element being positioned adjacent the end of the track which is the lead end with said frame moving in said one direction along said other course.

16. The apparatus of claim 1, wherein operatively interposed between each inlet coupling and said mobile conduit system there is an elongated flexible hose having one extremity fastened to the mobile conduit system and its other extremity mounted on the carriage for the inlet coupling, said hose permitting fluid flow between the inlet coupling and mobile conduit system, and accommodating movement of the carriage on said track.

17. The apparatus of claim 16, wherein each hose is disposed in a reverse bend between its said extremities and with the bend in the hose spaced from the hose's extremities toward the side of said frame which is the lead side thereof with the frame traveling along said other course in said one direction.

18. The apparatus of claim 17, wherein each hose has its said one extremity disposed adjacent one side of a track and its said other extremity disposed adjacent the other side of the track, and movable guide means is mounted on the track guiding the bend in the hose with movement of the hose's said other extremity along the track.

19. The apparatus of claim 18, wherein, considering a movable guide means and the hose and track associated therewith, the movable guide means comprises a carriage, separate from the first-mentioned carriage, supported for movement along said track, and a sheave supporting the bend in the hose mounted on said second-mentioned carriage for rotation about an upwardly extending axis.

20. The apparatus of claim 19, wherein said upwardly extending axis slopes upwardly and toward the hose's extremities.

21. The apparatus of claim 19, which further comprises a catch mounted on said frame intermediate the ends of said track, and a latch on said second mentioned carriage, said latch and catch engaging with movement of the second mentioned carriage in a direction opposite said one direction relative to said frame to a given position on said track, and when engaged yieldably resisting movement of the carriage from said given position in said one direction relative to said frame.

22. The apparatus of claim 19, wherein each track comprises a pair of elongated laterally spaced substantially parallel rails disposed in side-by-side relation, with one rail in a track having an elongated groove extending along it facing the other rail in the track, and said other rail having an upwardly projecting elongated ridge extending along it.

23. The apparatus of claim 22, wherein said tracks are disposed in side-by-side relation with the one rails in the tracks located inwardly of the other rails.

24. The apparatus of claim 23, wherein the longitudinal axes of said tracks substantially parallel one another.

25. The apparatus of claim 18, wherein, considering a hose and the track associated therewith, means is provided defining a first channel extending along said one side of said track adapted freely to receive and support the reach of said hose which extends from the hose's said one extremity toward the bend in the hose.

26. The apparatus of claim 25, wherein said first channel is constructed to accommodate lateral shifting of such a reach from the channel toward said track, and to inhibit such shifting in the opposite direction.

27. The apparatus of claim 25, which further comprises means defining a second channel extending along said other side of said track adapted freely to receive and support the reach of said hose which extends from the hose's said other extremity toward the bend in the hose.

28. The apparatus of claim 27, wherein, adjacent each track, the means defining a second channel comprises a plurality of rollers distributed along the length of the track for supporting the base of a reach in said second channel.

29. The apparatus of claim 19, wherein said interconnecting means comprises an elongated cable extending between and having opposite ends joined to said second-mentioned carriages, and training means training said cable between its said ends.

30. The apparatus of claim 29, wherein said training means comprises a pulley disposed against said cable, and said interconnecting means further comprises shock-absorbing means interposed between said pulley and said frame.

31. The apparatus of claim 30, wherein said cable and training means are disposed whereby movement of one of said second-mentioned carriages in a direction opposite said one direction relative to said frame tends to tense the cable.

32. Apparatus for producing a continuous fluid-flow connection between a stationary conduit system having a plurality of outlet couplings spaced along a course accommodating a connection with the system and a mobile conduit system supported in a frame traveling in one direction relative to said stationary system along another course adjacent and generally paralleling said first-mentioned course, said frame having a travel axis which at any given time substantially parallels said other course, said apparatus comprising a pair of relatively movable inlet couplings operatively connected to said mobile system, each adapted to be coupled releasably to an outlet coupling in said stationary system with said frame traveling along said other course, mounting means for each inlet coupling mounting the same on said frome for reciprocal movement along a path substantially paralleling said other course, the mounting means for the two inlet couplings comprising a pair of elongated tracks, and carriages supported for movement therealong, such mounting means accommodating adjustment of the inlet couplings to two different spaced-apart conditions with the inlet couplings in each of said conditions spaced by at least the maximum distance existing between adjacent outlet couplings in said stationary system, and in the two different conditions occupying reversed positions, and interconnecting means mounted on said frame operatively interconnecting said inlet couplings, and constructed to produce related movement thereof, whereby movement of an inlet coupling in one direction relative to said frame results in movement of the other inlet coupling in the opposite direction relative to the frame, said interconnecting means permitting adjustment of the inlet couplings to said two different spaced-apart conditions.

* * * * *